US006955779B2

(12) United States Patent
Massarotto

(10) Patent No.: US 6,955,779 B2
(45) Date of Patent: Oct. 18, 2005

(54) METHOD FOR THE CONTINUOUS PRODUCTION OF EXPANDED PLASTIC MATERIAL FOR FORMING PANELS AND THE LIKE, AND APPARATUS FOR CARRYING OUT THE METHOD

(75) Inventor: Loris Massarotto, Triuggio (IT)

(73) Assignee: Impianti OMS S.p.A., Verano Brianza (IT)

( * ) Notice: Subject to any disclaimer, the term of this patent is extended or adjusted under 35 U.S.C. 154(b) by 346 days.

(21) Appl. No.: 09/863,379

(22) Filed: May 24, 2001

(65) Prior Publication Data

US 2002/0063356 A1     May 30, 2002

(30) Foreign Application Priority Data

Nov. 30, 2000  (IT) .......................... MI2000A2596

(51) Int. Cl.[7] ............................................. B29C 44/20

(52) U.S. Cl. ...................... 264/51; 366/177.1; 425/4 C

(58) Field of Search ...................... 264/51; 366/177.1, 366/179.1; 425/4 C

(56) References Cited

U.S. PATENT DOCUMENTS

| 4,726,933 A | * | 2/1988 | Mayr et al. .................. 422/133 |
| 4,809,909 A | * | 3/1989 | Kukesh .......................... 239/1 |
| 5,087,514 A | * | 2/1992 | Graefe ...................... 428/315.5 |
| 5,201,580 A | * | 4/1993 | Bauer ....................... 366/159.1 |
| 6,297,342 B1 | * | 10/2001 | Schulte et al. ................ 528/44 |
| 6,353,053 B1 | * | 3/2002 | Friedrichs et al. .......... 524/871 |

FOREIGN PATENT DOCUMENTS

| DE | 133 642 | 1/1979 |
| DE | 278 985 | 5/1990 |
| FR | 2 318 022 | 2/1977 |

* cited by examiner

Primary Examiner—Allan R Kuhns
(74) Attorney, Agent, or Firm—Guido Modiano; Albert Josif; Daniel O'Byrne

(57) ABSTRACT

A method for the continuous production of expanded plastic material for forming panels and the like, in which during the pouring step, at least one reaction component and a mixture of the remaining components are introduced at high pressure in a pouring channel, by way of two injection assemblies. The mixture is provided downstream of a high-pressure pump and during the pouring hold step the remaining components of the mixture are individually placed in a recirculation step, without undergoing cross-contamination.

4 Claims, 2 Drawing Sheets

METHOD FOR THE CONTINUOUS PRODUCTION OF EXPANDED PLASTIC MATERIAL FOR FORMING PANELS AND THE LIKE, AND APPARATUS FOR CARRYING OUT THE METHOD

BACKGROUND OF THE INVENTION

The present invention relates to a method and an apparatus for the continuous production of expanded plastic material for forming panels and the like.

It is known that expanded polyurethane foams are typically obtained by pouring a so-called reactive, liquid mixture, constituted by the reagents, i.e., isocyanate and polyol, water, catalysts and so forth, and by any blowing agents such as hydrocarbons, hydrochlorofluorocarbons, hydrofluorocarbons, and the like.

In a few seconds, the reactive mixture starts to react, generating heat and carbon dioxide produced by the water-isocyanate reaction.

The carbon dioxide, together with the gases generated by the evaporation of any blowing agents, due to the heat generated by the chemical reactions, causes the expansion of the reactive mixture so as to generate the foam.

On the basis of this type of method, plants have been available for many years which allow the continuous production of low-density rigid foam panels for thermal insulation having, in cross-section, a rectangular shape or otherwise variously shaped; these panels can be produced in different lengths.

The foam of the lower and upper surfaces of the panels is coupled to substrates of various kinds, such as for example paper, bituminized paper, wood, metal plate and the like, which form outer claddings of said panel.

These panels are widely used, in particular, as insulators in the field of industrial building or in the field of industry or refrigeration.

Plants for manufacturing the panels generally have a series of dosage lines which dose out the components in the intended ratios to a fixed or movable mixing head which feeds the lower substrate of the cladding with the mixture produced by said lines, optionally by means of appropriately provided distribution units.

In another application, the reactive mixture can be applied by deposit on the upper substrate.

The reactive mixture enters a step of growth and polymerization and is conveyed, together with the upper and lower claddings, by appropriately provided movable conveyance and containment systems such as, for example, double conveyor belts, to a cutter for cutting the panels to the intended length.

A fundamental aspect in obtaining good-quality panels is the manner in which the reactive mixture is distributed by the mixing head onto the substrate of the cladding.

Accordingly, several systems have been proposed according to the type of panel to be produced and to the production rates; these systems use, for example, multiple fixed heads or a head which performs a reciprocating motion on a guide which is perpendicular to the panel production axis.

In the latter case, it is particularly important that the head be lightweight and compact, so as to allow easy placement of the injection head between the lower and upper substrates of the panel before entering the double containment belt.

In any event, however, containment of the weight and dimensions of the heads is a desideratum to achieve plant optimization.

In most cases, the production of thermal insulation panels requires the use of the cited blowing agents, and therefore such blowing agents are preferably added continuously at the time of production, with the advantage of being able to control their dosage according to the physical characteristics of the panel to be produced.

The addition can be performed directly in the mixing head or by premixing, in the exact amount required, by means of static or dynamic mixers, the blowing agent with one of the reactive components, for example the polyol, before said component, drawn from the storage tank, reaches the head in which final mixing occurs in order to prepare the reactive mixture to be deposited by pouring onto the substrate of the panel.

What has been described above for the blowing agent can in any case be extended to other components, catalysts and the like that are involved in the formation of the reactive mixture.

The concept already well known is that it is not convenient to perform the addition directly in the injection head, since an immediate consequence would be an increase in dimensions and weight, in addition to an increase in constructive complexity.

If high-pressure injection heads are used, problems are encountered in relation to the premixing of the various components, which is performed in the low-pressure part of the circuit, i.e., upstream of the high-pressure delivery pump.

This aspect causes considerable problems, since an inevitable seepage of the polyol high-pressure pump occurs which, exactly in the case of low-pressure premixing, can cause continuous changes in the ratio among the various components.

It is also known, in polyurethane foaming technology, that precise dosage and optimum thermostatic control of the components fed to the mixing head throughout the process are extremely important for obtaining products having optimum and constant characteristics.

For this purpose, for example, it is useful to provide, before the step of pouring the reactive mixture begins, a recirculation of the components which allows to obtain the required temperature, flow-rate and pressure conditions, thus avoiding transients, in the initial periods of the pouring process, in which these parameters are not ideal, consequently producing panels which do not have the intended quality characteristics.

In the current state of the art, therefore, the possibility to provide effective recirculation becomes an important factor in ensuring that the physical conditions of the components of the reactive mixture remain constant both during the pouring steps and during the recirculation steps.

SUMMARY OF THE INVENTION

The aim of the invention is to eliminate the above noted drawbacks, by providing a method for the continuous production of expanded plastic material for forming panels and the like which allows to perform a step of recirculation in the head at high pressure which allows to avoid altering the ratios among the various components, maintaining at all times the optimum ratios and preventing the occurrence of incorrect mixing.

Within this aim, a particular object of the invention is to provide a method in which it is possible to perform high pressure recirculation despite having a mixing head or pouring assembly in which only two injection assemblies are available, thus reducing to a minimum the dimensions and volume of the mixing head.

Another object of the present invention is to provide an apparatus for the continuous production of expanded plastic material which thanks to its particular constructive characteristics is capable of giving the greatest assurances of reliability and safety in use.

Another object of the present invention is to provide an apparatus which can be easily obtained starting from commonly commercially available elements and materials and is furthermore competitive from a merely economical point of view.

This aim and these and other objects which will become better apparent hereinafter are achieved by a method for the continuous production of expanded plastic material for forming panels and the like, according to the invention, which consists, during the pouring step, in introducing at high pressure in a pouring channel, by means of two injection assemblies, at least one reaction component and a mixture of the remaining components, characterized in that said mixture is provided downstream of the high-pressure pump and in that during the pouring hold step said remaining components of the mixture individually enter a recirculation step.

BRIEF DESCRIPTION OF THE DRAWINGS

Further characteristics and advantages will become better apparent from the description of a method for the continuous production of expanded plastic material for forming panels and the like and of the apparatus for carrying out the method, illustrated with the aid of the accompanying drawings, wherein.

DESCRIPTION OF THE PREFERRED EMBODIMENTS

Figure 1:
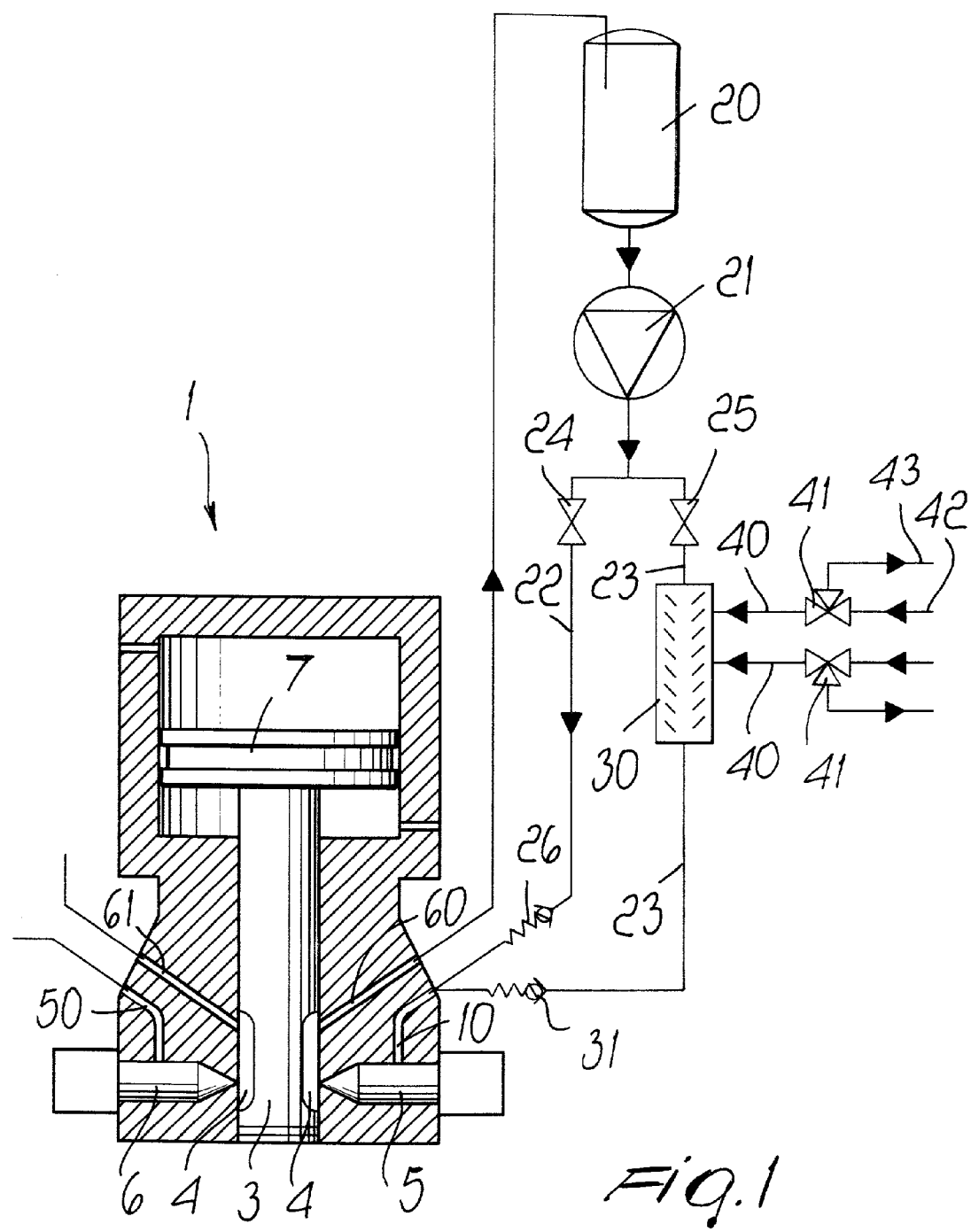
FIG. 1 is a schematic view of the apparatus during the recirculation step.

With reference to the figures, the apparatus for the continuous production of expanded plastic material for forming panels and the like comprises a mixing head, generally designated by the reference numeral 1, which in a per se known manner defines internally a pouring channel 2 in which a self-cleaning piston 3 can move hermetically, with recirculation slots 4 which are arranged at a first injection assembly 5 and at a second injection assembly 6.

The piston 3 can perform a translation movement by means of a piston 7 in order to position the slots 4 in the recirculation position, as shown in FIG. 1, or in the pouring position, in which the piston 3 releases the injection assemblies in order to perform mixing and pouring of the foam.

The first injection assembly 5 is connected to a duct 10 for introducing a mixture of components which can include, for example, polyol mixed with blowing reagents, catalysts and the like.

For this purpose, there is a polyol tank 20, downstream of which there is a high-pressure pump 21 which introduces the polyol in a first delivery branch 22 and a second delivery branch 23, respectively controlled by a first two-way valve 24 and by a second two-way valve 25.

The first branch 22 is connected, with the interposition of a first calibrated one-way valve 26, to the delivery duct 10 in close proximity to the mixing head, while on the second delivery branch 23 there is a mixer 30 for introducing the remaining components of the mixture.

The second branch 23, downstream of the mixer 30, has a second calibrated one-way valve 31 connected to the delivery duct 10, which is also in close proximity to the mixing head 1.

At least one duct for introducing the remaining components, such as blowing agents, catalysts and so forth, is connected to the mixer 30.

The specific example illustrates two ducts 40 on which a respective three-way valve 41 is arranged which connects a product delivery duct 42 and a recirculation duct 43.

The second injection assembly 6 is connected to a second delivery duct 50 for introducing, for example, the isocyanate or in any case another component of the mixture.

A first recirculation duct 60, located at the first injection assembly 5, and a second recirculation duct 61, located at the second injection assembly 6, are further provided on the mixing head.

In practical operation, when the apparatus is in the initial recirculation conditions, the polyol is drawn from the storage tank 20 and is introduced, by means of the high-pressure pump 21, toward the delivery branches 22 and 23.

In recirculation conditions, the valve 25 is closed and the valve 24 is open, and therefore the polyol flows through the first branch 22 and, by means of the one-way or check valve 26, it is introduced in the mixing head, where by flowing through the correspondingly arranged slot 4 it is introduced in the first recirculation duct 60, which returns the polyol into the tank 20.

The one-way or check valve 31 prevents from flowing the polyol toward the mixer 30, thus isolating it and the corresponding delivery branch from the mixing head, which is of the self-cleaning type.

Clearly, instead of the one-way valves 26 and 31, manually- or automatically-operated isolator valves can be used.

In this manner, a complete recirculation is obtained which occurs through the head for mixing the polyol alone without blowing agents, catalysts or other components of the reactive mixture, which are recirculated by means of the three-way valve or equivalent valves, which provide to divert the flow that arrives from the delivery duct 42 toward the corresponding recirculation duct 43 before introduction in the mixer.

It should also be added that the apparatus can return the polyol directly at the intake of the high-pressure pump 21 instead of directly into the storage tank 20, thus excluding from the recirculation the storage tank and any possibility of introducing blowing agent, catalysts and/or other components in the reactive mixture.

Clearly, the other component of the reaction, i.e. the isocyanate, is also in the recirculation step and is recycled in a conventional manner by means of the second delivery duct and the second recirculation duct 61 with the passage through the corresponding slot 4.

Figure 2:
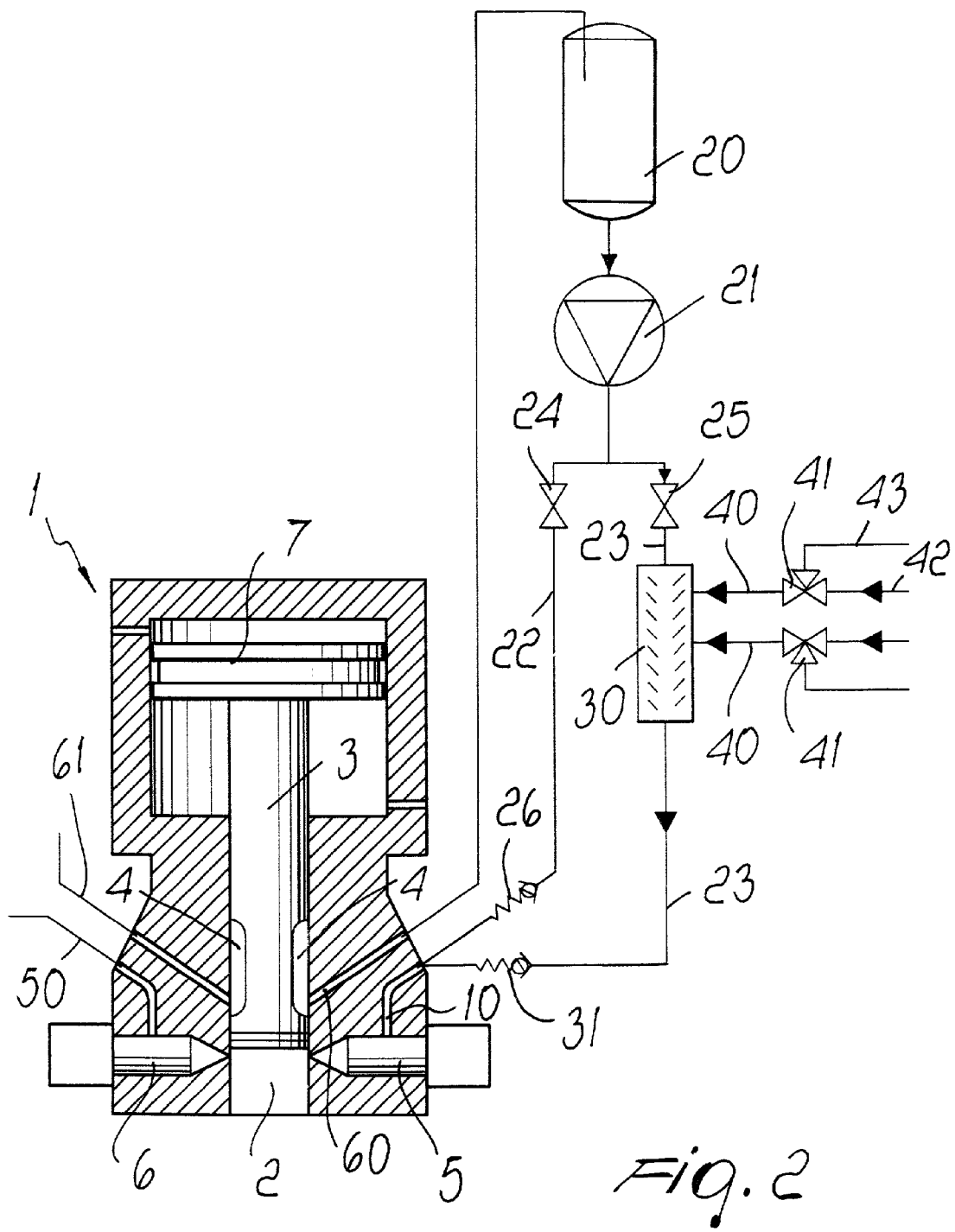
FIG. 2 is a schematic view of the apparatus during the pouring step.

In order to pass from the recirculation step to the pouring step, shown in FIG. 2, first the mixing head is opened by the action of the self-cleaning piston 3, which is translated by the piston 7, thus opening the valve 25 and then closing the valve 24, so that the polyol is introduced in the second branch, which sends it toward the mixer 30.

The three-way valves 41 also switches, so that the other components of the mixture, such as blowing agents, catalysts and the like, are mixed with polyol.

The beginning of this sequence, with the opening of the mixing head, interrupts the step of recirculation of the polyol before the blowing agent, the catalysts or the components of the reactive mixture to be premixed with the polyol are introduced in the mixer, thus making it impossible for said components to reach the storage tank 20.

Opening the valve 25 before closing the valve 24 provides protection from the danger of overpressures due to the simultaneous closure of both valves.

At the end of this sequence of operations, the polyol is taken from the storage tank 20 and is sent, by means of the high-pressure pump 21 through the valve 25 to the mixer 30, which also receives the blowing agent, the catalysts and any other components of the reactive mixture through the respective three-way valves 41.

The polyol, after being premixed with the blowing agent, the catalysts or any other components of the reactive mixture by the mixer 30, through the second one-way valve 31, which is also arranged very close to the mixing head, is introduced in the first injection assembly 5, which injects the mixture into the pouring channel simultaneously with the isocyanate introduced by the other injection assembly, thus providing the reactive mixture, which exits from the pouring channel 2.

The one-way valve 26 in practice isolates the first branch 22 from the flow of premixed polyol.

The above disclosed sequence of operations must be performed as quickly as possible, optionally even with a partial overlap of the execution times of some consecutive operations, insofar as this is allowed by the components used, following in any case the described sequence, in order to minimize the amount of reactive mixture that is poured without having optimum quality.

At the end of the pouring time, in order to return the plant to the initial recirculation conditions, first the three-way valves 41 that introduce the blowing agents, the catalysts or the other components to be added are switched and the valve 24 is simultaneously opened; then the valve 25 is closed.

The mixing head is then closed by moving the self-cleaning piston 3, which places its slots 4 at the injection assemblies.

This transition to the recirculation step can optionally be performed with a short delay in order to flush with pure polyol the delivery duct 10, which is common for the polyol and the remaining components.

The switching, as a first operation, of the three-way valves 41, and the closure, with optional delay, of the mixing head, as final operation of the sequence, together with the action of the second one-way valve 31, which in practice isolates the second branch 23 from the mixing head, prevents the recirculation to the storage tank 20 of amounts of blowing agents, catalysts and other components of the reactive mixture.

The above disclosed operations must of course be performed as quickly as possible, optionally also with partial overlaps of the times of some consecutive operations, so as to minimize the amount of reactive mixture that is poured, at the end of production, without the necessary requirements that ensure optimum quality of the produced panel.

Another important aspect is that the one-way valves 26 and 31 must be fitted as close as possible to the mixing head or directly on said mixing head, thus minimizing the path shared by polyol and other components of the mixture, so as to minimize said flushing time and the amount of reactive mixture that is poured before the mixing head closes.

It should also be added that it is possible to provide other structural solutions for the apparatus, such as for example the replacement of the first and second isolator or cut off valves 24 and 25 with a single three-way valve, without altering the types of the operating steps being performed.

From the above description it is evident that the invention achieves the intended aim and objects, and in particular the fact is stressed that the described solution allows to have a high-pressure mixing head with recirculation in the head which allows to always have optimum component dosage despite having a mixing head with only two injection assemblies, and allows to perform mixing of the polyol with the other components of the mixture downstream of the high-pressure pump, so as to always maintain precise values of the percentages of the various components.

The system has also the advantage that during production, if the percentage of the components of the reactive mixture varies, the effect is immediately evident on the panel being produced; whereas with the conventional system the transient would be longer and therefore more finished product would be rejected.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2000A002596 from which this application claims priority are incorporated herein by reference.

What is claimed is:

1. A method for continuous production of expanded plastic material for forming panels comprising: providing an apparatus for continuous production of expandable plastic material which includes a pouring channel, two injection assemblies, a pump, and a mixing head; a pouring step, in which at least one reaction component and a mixture of remaining components for obtaining the expandable plastic material are introduced in said pouring channel by way of said two injection assemblies, said mixture being formed downstream of said pump; a pouring hold step; and a recirculation step, and wherein during the pouring hold step said remaining components sit individually placed in the recirculation step, wherein said at least one reaction component is constituted by isocyanate and said mixture of the remaining components is constituted by polyol mixed with blowing agents, and catalysts, said apparatus having a first delivery branch, a second delivery branch which is distinct and separate from the first delivery branch, and a mixer arranged at the second delivery branch, said polyol being fed during the recirculation step by way of said first delivery branch, said apparatus having at least one duct for introducing blowing agents, and catalysts which merges onto said mixer, the polyol being introduced, during said pouring step, in said second delivery branch in order to flow through the mixer, one-way valves being provided on said first and second delivery branches of said apparatus, said first delivery branch and said second delivery branch merging close to said mixing head, and comprising the step of recirculating said blowing agents and catalysts before they are introduced in said mixer.

2. The method of claim 1, comprising providing a polyol storage tank for said apparatus and wherein, during the recirculation step, the polyol is returned to the polyol storage tank.

3. The method of claim 1, comprising a transition step between the recirculation step and the pouring step, in which the pouring channel located in the mixing head is opened and passage toward said second branch is first opened to the polyol and then passage through said first branch is closed, the remaining components of the mixture being introduced after passage of the polyol in the mixer.

4. The method of claim 3, wherein during the transition step between the pouring step and the recirculation step, flow of the polyol through said mixer is interrupted after the at least one duct for introducing the blowing agents, and catalysts has been set to recirculation.

* * * * *